Jan. 12, 1943.  H. HOOVER, JR  2,307,792
SEISMOMETER
Filed July 28, 1939   3 Sheets-Sheet 1
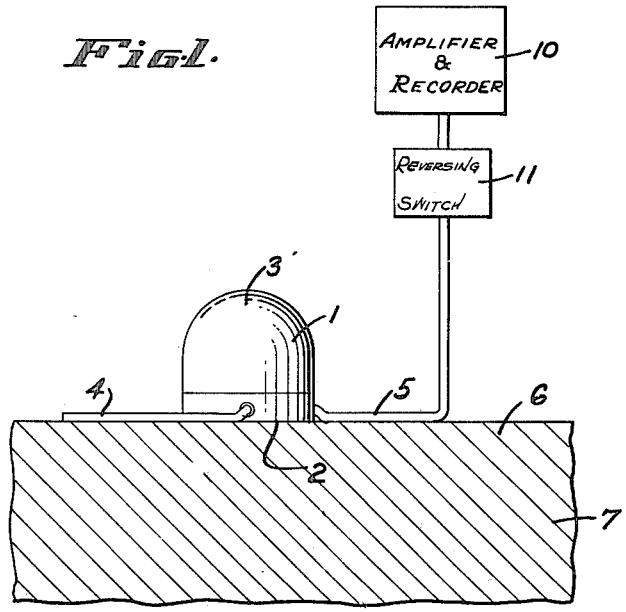
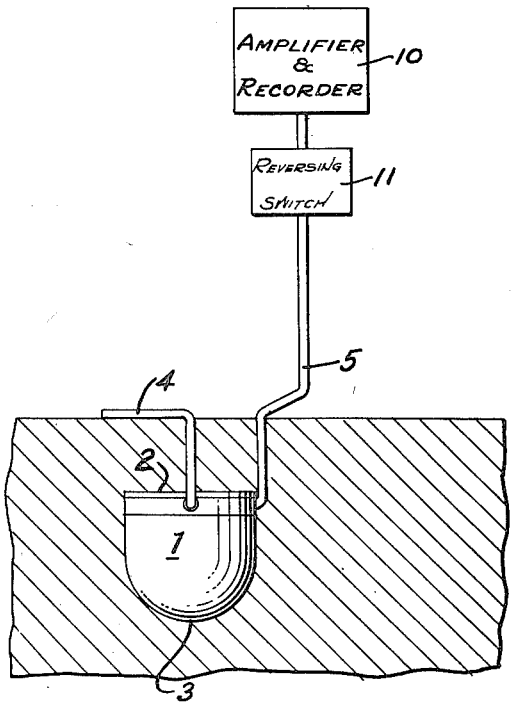
INVENTOR.
HERBERT HOOVER JR.
BY
ATTORNEYS.

Jan. 12, 1943.  H. HOOVER, JR  2,307,792
SEISMOMETER
Filed July 28, 1939   3 Sheets-Sheet 2
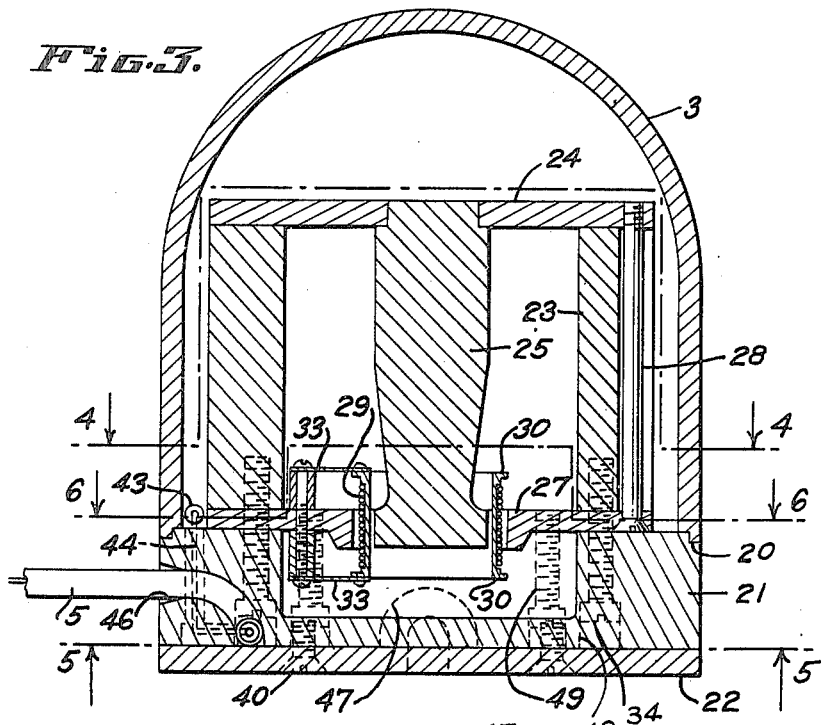
Fig. 2.
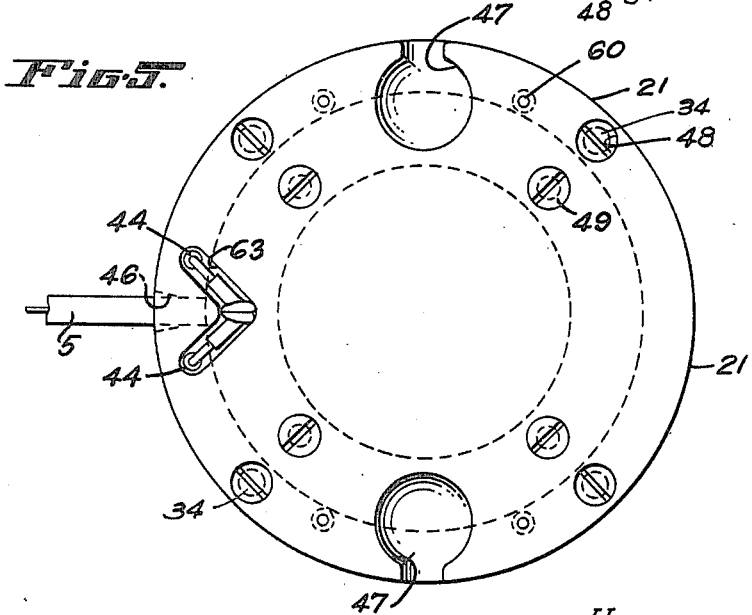
Fig. 3.
INVENTOR.
HERBERT HOOVER JR.
BY
ATTORNEYS.

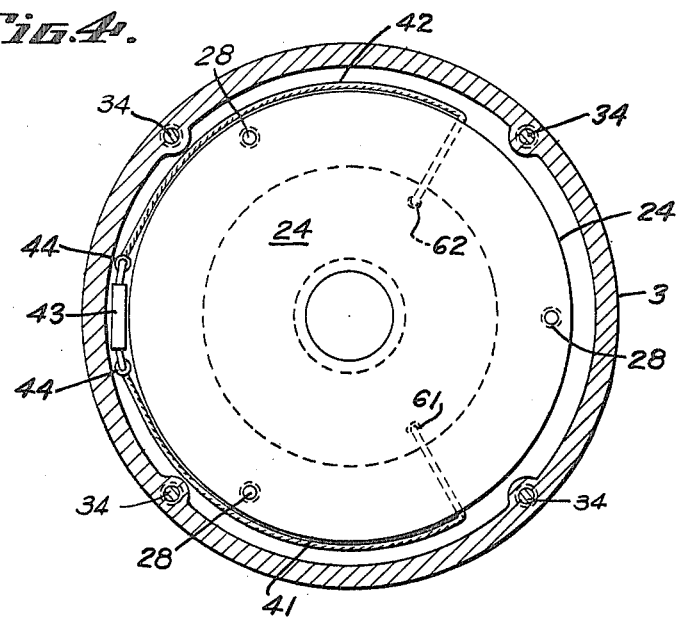
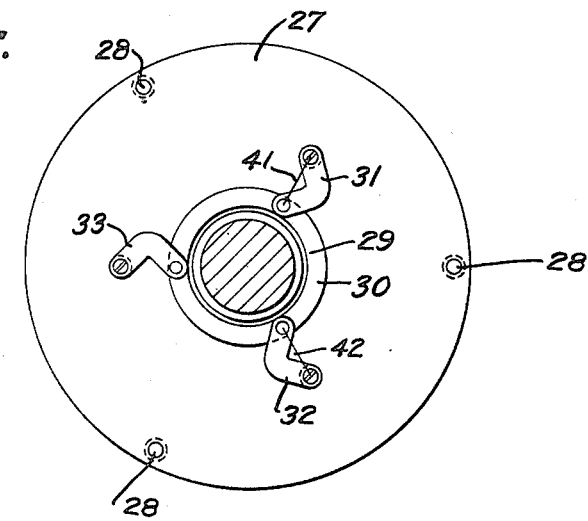

Patented Jan. 12, 1943

2,307,792

UNITED STATES PATENT OFFICE 2,307,792

SEISMOMETER

Herbert Hoover, Jr., Sierra Madre, Calif., assignor to Consolidated Engineering Corporation, Pasadena, Calif., a corporation of California Application July 28, 1939, Serial No. 287,073

4 Claims. (Cl. 177—352)

This invention relates to seismic exploration.

In exploring the earth by the seismic method, seismic waves are usually produced by detonating an explosive charge at or near the surface of the earth. Some of the waves so generated travel downward in the earth and are reflected upward by layers at various depths. The reflected waves returning to the surface of the earth reach seismometers which are positioned at various spaced points from the generating point, and are converted by the seismometers into electrical voltage waves of corresponding amplitude and frequency. The electrical waves received at each seismometer are then amplified and recorded. The records produced by this method usually contain a plurality of oscillograph traces generally extending in a direction corresponding to the elapse of time and have displacements in a direction perpendicular to the time axis. Such displacement represents the instantaneous motion of the earth at the point where the corresponding seismometer is located during the reception of the seismic wave.

When a wave reaches a seismometer sensitive to movements along an axis such as the vertical, earth movements in one direction, say upward, produce voltages of one sign while earth movements in the opposite direction produce voltages of the opposite sign. These are recorded as oscillograph trace displacements in opposite directions.

Sometimes a seismometer is placed at the surface of the earth with its axis pointing upward, and sometimes with its axis pointing downward. Under these different circumstances, trace displacements in a given direction on the record sometimes represent upward movement of the earth, and at other times may represent downward movement of the earth. Such variations in the sense relationship between the earth movement and the trace displacement are quite often difficult to detect, and may result in errors in interpretation. It is frequently also important to know the direction of earth movement.

Accordingly, the object of my invention is to provide for recording a series of seismic waves received at different points or at different times at the same point, in which the direction of trace displacement on the record always bears the same sense relationship to ground movement, regardless of which of two seismometer orientations may be in use at the time the respective ground movements are being detected.

Other objects of my invention will be apparent or will be specifically pointed out in the description forming a part of this specification, but I do not limit myself to the embodiment of the invention herein described, as various forms may be adopted within the scope of the claims.

In order to accomplish the object of my invention, I utilize some form of adjustable signal inversion means such as a reversing switch connected in the electrical circuit between the seismometer and the amplifier, recorder or other wave reproducer. To produce records in which the trace displacement always bears the same sense relationship to ground movement regardless of which of two opposite planting orientations may be assumed for the seismometer, I record waves without inversion for one orientation, and record the waves with inversion when the other seismometer orientation is in use.

Referring to the drawings:

Fig. 1 is a schematic view of my seismometer planted on the surface of the earth, together with an associated seismic wave reproducing channel.

Fig. 2 is a schematic view of my seismometer planted beneath the surface of the earth together with the associated seismic wave reproducing channel.

Fig. 3 is a central vertical section of the interior of one embodiment of my invention.

Fig. 4 is a plan view partly in section taken along the line 4—4 of Fig. 3.

Fig. 5 is a bottom view of the base plate of my seismometer as viewed along line 5—5 of Fig. 3.

Fig. 6 is a detail bottom view of my seismometer with base plate and cover plate removed and showing one method of mounting a moving coil in my seismometer.

As illustrated in Figs. 1, 2 and 3 the general external features of my seismometer 1 are a flat surface on one end 2, a dome shape on the other end 3, a carrying rope 4, and a cable 5. Said carrying rope 4 and cable 5 are attached to the seismometer adjacent its flat end so as to permit solid contact of the flat end 2 when planted on the surface 6 of the earth 7 and to offer a minimum amount of wind resistance when thus planted, as shown in Fig. 1. When planted in this manner my seismometer is subject to a minimum amount of wind disturbance partly because the rope 4 and cable 5 lie in direct contact with the earth except for a very short portion next to the seismometer case and partly because wind currents readily flow over the smooth dome 3.

When I desire to plant my seismometer beneath the earth's surface I dig a hole which has a dome shaped or round bottom, place the dome end of my seismometer in contact with said bottom so as to form a firm contact with the soil and cover the seismometer with soil thus froming a plant as shown in Fig. 2. It is clear that when planted beneath the surface in this manner my seismometer provides firm contact with the ground at all points and disturbances due to any vibration of loose soil are avoided.

As is well known in the art, a seismometer converts earth motion into corresponding electromotive forces which are amplified and recorded by apparatus symbolized by 10 in Figs. 1 and 2. The records produced are oscillograph traces which accordingly represent ground motion. In order to provide a one to one correlation between the direction of ground movement and the direction of displacement of such an oscillograph trace I utilize a reversing switch 11 to reverse the connections of cable 5 and the amplifier 10 when I change from a surface plant of Fig. 1 to a subsurface plant of Fig. 2.

Referring to Fig. 3, the dome shaped cover 3, forms an inset machine fit 20 with the main base plate 21; and 22 is a cover plate. Said dome 3, base plate 21, and cover plate 22 are made of non-magnetic material. Within the casing formed by the dome 3 and plate 21 is mounted an annular permanent magnet 23 having at one end an annular soft iron end plate 24 to which an annular soft iron pillar 25 is secured by a press fit, and at the other end an annular soft iron ring 27. Said ring 27 and said end plate 24 are secured to said annular magnet 23 by screws 28. An air gap is formed between the ring 27 and pillar 25 as shown in such a manner that magnetic flux flows through the gap radially and is substantially uniform throughout the width of the gap. An annular moving coil 29 comprising a copper winding in a brass cylindrical spool is flexibly suspended in said air gap. The copper winding itself is preferably longer than the vertical length of the air gap for reasons which will be pointed out below. As shown in Figs. 3 and 6 said coil 29 is mounted in spool 30—30 and the whole suspended from the end ring 27 by means of two spider type suspensions each comprising a set of springs 31, 32, and 33.

Referring to Fig. 4 the dome 3 is secured to plate 21 by screws 34. Leads 41 and 42 connected respectively to the winding of coil 29 at spring mounts 61 and 62 are connected to damping resistor 43.

As illustrated in Fig. 5 said leads 41 and 42 pass through holes 44—44 in base plate 21 and connect with cable 5 in the V shaped slot 63 and the cable passage 46. Base plate 21 has two round cavities 47 into which knotted ends of carrying rope 4 fit. Base plate 21 also has countersunk bores 48 through which dome holding screws 34 pass. In addition there are screws 49 for firmly mounting the ring 27, magnet 23, and end plate 24 within the case. Taps 60 are adapted to receive screws 40 for holding the cover plate 22 to the base plate 21.

I provide a hermetic seal by means of inset joint 20 and by filling holes 48, 44, and 46 with a high melting point asphalt or wax. Cover plate 22 serves to hold carrying rope 4 to the sides of the case and also protects the portion of cable 5 and leads 41 and 42 which lie in V-shaped slot 63. Said cover plate 22 and base plate 21 make possible easy replacement of said carrying rope 4 without breaking the seal of said seismometer.

In order to obtain substantially uniform sensitivity in either seismometer plant shown in Figs. 1 or 2, I use a dynamic type instrument as illustrated in which the mass of the moving coil is small and the natural period of said coil falls in the region of the lowest frequency seismic waves I expect to record. Such a suitable natural frequency lies at about 15 or 20 cycles. With a coil having such characteristics, the winding will cut almost all the flux passing through the air gap in both positions shown in Fig. 2 and also when the seismometer lies on its side or any other position.

I claim:

1. In apparatus for seismic surveying a seismometer having opposite ground planting orientations making ground contact with seismometer surfaces of different contour, said seismometer having substantially equal sensitivity to vibratory earth motion in either of the two opposite planting orientations, said seismometer being adapted to generate electrical vibratory signals corresponding to the vibratory earth motion in either orientation. the electrical signals generated in the two orientations being of opposite polarity, a vibration recorder electrically connected to the seismometer, and a reversing switch connected intermediate the seismometer and the recorder adapted to control the sense of the recorded vibration to facilitate recording the electrical waves with the same sense relationship to the received earth motion irrespective of the planting orientation of said seismometer.

2. In making a series of seismic vibration records in the course of seismic prospecting involving the planting of a seismometer in the earth in any one of a number of predetermined orientations, receiving seismic waves at the seismometer, converting the seismic waves into corresponding electrical waves in which the sense relationship of the electrical waves to the received seismic waves depends on the orientation in which the seismometer is planted, and recording the electrical waves, the improvement which comprises converting at least one received seismic wave into an electrical wave bearing one sense relationship to the received seismic wave, converting each of the remaining received seismic waves into an electrical wave bearing the opposite sense relationship to these remaining received waves, directly recording electrical waves bearing one sense relationship to the received seismic waves, and reversing the polarity of the other electrical waves prior to recording so as to produce a series of records in which the recorded waves always bears a fixed sense relationship to the received seismic waves.

3. Apparatus for seismic surveying comprising a seismometer having ground contact surfaces of differing contour and having substantially equal sensitivity to ground motion in either of two opposite planting orientations in each of which one of said surfaces is beneath the other and in contact with the ground, a seismic wave amplifier connected to the seismometer, a reproducer connected to the output of the amplifier, and signal inversion means connected in the circuit interconnecting the seismometer and the reproducer to provide the same sense relationship of the reproduced wave to the received earth motion irrespective of which of the two planting orientations is utilized during the detection of the earth motion.

4. Apparatus for seimic surveying comprising a seismometer having opposite ground contact surfaces of differing contour and having substantially equal sensitivity in either of two opposite planting orientations assumed by said seismometer when one of said surfaces is in contact with the ground and beneath the other, a seismic wave amplifier connected to said seismometer, a reproducer connected to the output of said amplifier, and means for inverting the sense of signals passing through said connections in accordance with seismometer orientation to provide the same sense relationship of the reproduced wave to the received earth motion irrespective of the seismometer planting orientation in use at the time of the wave reception.

HERBERT HOOVER, JR.